(12) United States Patent
Ovrutsky et al.

(10) Patent No.: US 9,910,239 B2
(45) Date of Patent: Mar. 6, 2018

(54) WAFER LEVEL OPTICAL ELEMENTS AND APPLICATIONS THEREOF

(75) Inventors: David Ovrutsky, Charlotte, NC (US); William Hudson Welch, Charlotte, NC (US); Roman C. Gutierrez, Pasadena, CA (US); Robert J. Calvet, Pasadena, CA (US)

(73) Assignee: FLIR Systems Trading Belgium BVBA (BE)

( * ) Notice: Subject to any disclaimer, the term of this patent is extended or adjusted under 35 U.S.C. 154(b) by 13 days.

(21) Appl. No.: 12/957,112

(22) Filed: Nov. 30, 2010

(65) Prior Publication Data

US 2012/0133916 A1   May 31, 2012

(51) Int. Cl.
  *G02B 27/10*   (2006.01)
  *G02B 7/02*    (2006.01)
  *G02B 13/00*   (2006.01)

(52) U.S. Cl.
  CPC ......... *G02B 7/022* (2013.01); *G02B 13/0085* (2013.01); *Y10T 428/24942* (2015.01)

(58) Field of Classification Search
  CPC ......... H01L 27/14627; H01L 27/14625; H01L 31/02325; H01L 2933/0058; H01L 31/02327; H01L 24/97; H01L 25/0657; H01L 27/14632; H01L 33/58; G02B 3/0006; G02B 3/0062; G02B 1/041; G02B 7/003; G02B 6/426; G02B 13/0085; G02B 3/0075; G02B 6/423; G02B 7/02; G02B 13/006; G02B 13/0035; G02B 7/022; G02B 13/004; B29D 11/00355; B29D 11/0073

USPC .................................................. 359/618–626
See application file for complete search history.

(56) References Cited

U.S. PATENT DOCUMENTS

| | | | | |
|---|---|---|---|---|
| 5,024,509 | A | * | 6/1991 | Kurihara ....................... 359/741 |
| 7,974,023 | B1 | * | 7/2011 | Chen ............................ 359/819 |
| 2004/0212719 | A1 | * | 10/2004 | Ikeda .................. H04N 5/2254 |
| | | | | 348/340 |
| 2005/0030647 | A1 | | 2/2005 | Amanai |
| 2006/0239605 | A1 | * | 10/2006 | Palen et al. ..................... 385/14 |
| 2010/0013113 | A1 | | 1/2010 | Chang |
| 2010/0079635 | A1 | * | 4/2010 | Yano et al. ................... 348/294 |

FOREIGN PATENT DOCUMENTS

| | | |
|---|---|---|
| JP | 2009-251366 | 10/2009 |
| WO | WO 2008/011003 A2 | 1/2008 |
| WO | WO 2009/088241 A2 | 7/2009 |

OTHER PUBLICATIONS

Patent Cooperation Treaty, International Search Report and Written Opinion, International Application No. PCT/US2011/060938, dated May 15, 2012.

* cited by examiner

*Primary Examiner* — Alicia M Harrington
(74) *Attorney, Agent, or Firm* — Haynes and Boone, LLP

(57) ABSTRACT

In one aspect, the present invention provides a wafer level optical assembly comprising a first wafer level optical element, the first wafer level optical element comprising a first alignment structure and a second wafer level optical element, the second wafer level optical element comprising a second alignment structure, wherein the first alignment structure contacts the second alignment structure.

23 Claims, 15 Drawing Sheets

WAFER LEVEL OPTICAL ELEMENTS AND APPLICATIONS THEREOF

FIELD OF THE INVENTION

The present invention relates wafer level optical elements and assemblies incorporating the same.

BACKGROUND OF THE INVENTION

Optical imaging apparatus incorporating wafer level optical elements find application in a variety of fields, including consumer electronics. Solid state cameras comprising wafer level optical elements, for example, are used in a number of consumer electronics such as cell phones, digital still cameras, computers, toys and automotive driver aids. In order to satisfy demand, wafer level optical elements and optical assemblies are required to be manufactured in significant quantities. Efficient manufacture of wafer level optical elements and assemblies is, therefore, of high importance.

Compound yield issues, however, pose significant challenges to stacked optical assemblies constructed by wafer to wafer integration techniques, leading to wasted product and increased inefficiencies. Moreover, wafer to wafer misalignment can propagate optical element misalignment across a significant number of optical assemblies, further reducing product yield.

SUMMARY

In view of the foregoing, the present invention provides wafer level optical elements and methods of assembling wafer level optical elements which, in some embodiments, can mitigate compound yield issues and optical element misalignment in the production of optical assemblies.

In one aspect, the present invention provides a wafer level optical assembly comprising a first optical element singulated from a first array of optical elements, the first optical element comprising a first alignment structure and a second optical element, the second optical element comprising a second alignment structure, wherein the first alignment structure and the second alignment structure are in contact. In some embodiments, the second optical element is singulated from a second array of optical elements. In some embodiments, the first array of optical elements and the second array of optical elements are different. In some embodiments, the first array of optical elements and the second array of optical elements are the same array.

In some embodiments, the first optical element and/or the second optical element comprises at least one planar surface. In some embodiments, the first optical element and/or the second optical element comprises a plurality of planar surfaces. In some embodiments, one or more planar surfaces are located at the perimeter of the first optical element and/or second optical element. In some embodiments, the perimeter of the first optical element and/or second optical element has a polygonal shape.

As described herein, in some embodiments, the first optical element and/or the second optical element is singulated from a wafer or array of optical elements, the singulation process providing the first and/or second optical elements with one or more planar surfaces.

Moreover, in some embodiments, a wafer level optical assembly described herein comprises one or more planar surfaces located at the perimeter of the assembly. In some embodiments, the perimeter of a wafer level optical assembly described herein has a polygonal shape.

In some embodiments, the first alignment structure of the first optical element is positioned outside the clear aperture of the first optical element. In some embodiments, the second alignment structure of the second optical element is positioned outside the clear aperture of the second optical element.

In some embodiments, the first alignment structure is continuous around the clear aperture of the first optical element. In some embodiments, the first alignment structure is discontinuous around the clear aperture of the first optical element. In some embodiments wherein the first alignment structure is discontinuous around the clear aperture of the first optical element, the first alignment structure comprises a plurality of discrete alignment structures operable to contact the second alignment structure of the second optical element.

Additionally, in some embodiments, the second alignment structure is continuous around the clear aperture of the second optical element. In some embodiments, the second alignment structure is discontinuous around the clear aperture of the second optical element. In some embodiments wherein the second alignment structure is discontinuous around the clear aperture of the second optical element, the second alignment structure comprises a plurality of discrete alignment structures operable to contact the first alignment structure of the first optical element.

In some embodiments of a wafer level optical assembly, the first optical element comprises a discontinuous first alignment structure comprising a plurality of discrete alignment structures in contact with a continuous second alignment structure of the second optical element. In some embodiments of a wafer level optical assembly, the first optical element comprises a continuous first alignment structure in contact with a plurality of discrete alignment structures of a discontinuous second alignment structure of the second optical element. In some embodiments of a wafer level optical assembly, the first optical element comprises a discontinuous first alignment structure comprising a plurality of discrete alignment structures in contact with a plurality of discrete alignment structures of a discontinuous second alignment structure of the second optical element.

In some embodiments, a wafer level optical assembly described herein is positioned over an electro-optical element to provide an optical imaging apparatus. In some embodiments, an electro-optical element comprises an electromagnetic radiation sensing element. In some embodiments, an electro-optical element generates electromagnetic radiation to be provided by the optical imaging apparatus.

In another aspect, the present invention provides methods of producing optical imaging apparatus. In some embodiments, a method of producing optical imaging apparatus comprises providing a singulated first object side optical element comprising an alignment structure and providing a image side wafer comprising a first image side optical element comprising an alignment structure. The singulated first object side optical element is positioned over the first image side optical element and at least partially aligned with the first image side optical element by bringing into contact the alignment structure of the first object side optical element and the alignment structure of the first image side optical element to provide a first optical assembly at a first location on the image side wafer. In some embodiments, one or more optical properties of the first object side optical element and/or first image side optical element are determined prior to positioning the singulated first object side optical element over the first image side optical element.

In some embodiments, a method of producing optical imaging apparatus further comprises determining the focal length of the first optical assembly, calculating a focus compensation for the first optical assembly relative to an image plane and adjusting the height of the image side wafer at the first optical assembly location to provide the focal point of the first optical assembly at or near the image plane. In some embodiments, a method of producing an optical imaging apparatus further comprises coupling a first electro-optical element to the first optical assembly.

In some embodiments, a method of producing optical imaging apparatus further comprises providing a singulated second object side optical element comprising an alignment structure and providing a second image side optical element of the image side wafer, the second image side optical element comprising an alignment structure. In some embodiments, the singulated second object side optical element is positioned over the second image side optical element and at least partially aligned with the second image side optical element by bringing into contact the alignment structure of the second object side optical element and the alignment structure of the second image side optical element to provide a second optical assembly at a second location on the image side wafer. In some embodiments, one or more optical properties of the second object side optical element and/or second image side optical element are determined prior to positioning the second object side optical element over the second image side optical element.

In some embodiments, a method of producing an optical imaging apparatus further comprises determining the focal length of the second optical assembly, calculating a focus compensation for the second optical assembly relative to an image plane and adjusting the height of the image side wafer at the second optical assembly location to provide the focal point of the second optical assembly at or near the image plane.

In some embodiments, the height to which the image side wafer is adjusted at the location of the first optical assembly is different from the height to which the image side wafer is adjusted at the location of the second optical assembly. In some embodiments, the height to which the image side wafer is adjusted at the location of the first optical assembly is the same or substantially the same as the height to which the image side wafer is adjusted at the location of the second optical assembly.

In some embodiments, a method of producing optical imaging apparatus further comprises coupling a second electro-optical element to the second optical assembly.

Alternatively, in some embodiments, a method of producing optical imaging apparatus comprises providing a singulated first image side optical element comprising an alignment structure and providing a object side wafer comprising a object image side optical element comprising an alignment structure. The singulated first image side optical element is positioned over the first object side optical element and at least partially aligned with the first object side optical element by bringing into contact the alignment structure of the first image side optical element and the alignment structure of the first object side optical element to provide a first optical assembly at a first location on the object side wafer. In some embodiments, one or more optical properties of the first image side optical element and/or first object side optical element are determined prior to positioning the singulated first image side optical element over the first object side optical element.

In some embodiments, a method of producing optical imaging apparatus further comprises determining the focal length of the first optical assembly, calculating a focus compensation for the first optical assembly relative to an image plane and adjusting the height of the object side wafer at the first optical assembly location to provide the focal point of the first optical assembly at or near the image plane. In some embodiments, a method of producing an optical imaging apparatus further comprises coupling a first electro-optical element to the first optical assembly.

In some embodiments, a method of producing optical imaging apparatus further comprises providing a singulated second image side optical element comprising an alignment structure and providing a second object side optical element of the object side wafer, the second object side optical element comprising an alignment structure. In some embodiments, the singulated second image side optical element is positioned over the second object side optical element and at least partially aligned with the second object side optical element by bringing into contact the alignment structure of the second image side optical element and the alignment structure of the second object side optical element to provide a second optical assembly at a second location on the object side wafer. In some embodiments, one or more optical properties of the second image side optical element and/or second object side optical element are determined prior to positioning the second image side optical element over the second object side optical element.

In some embodiments, a method of producing an optical imaging apparatus further comprises determining the focal length of the second optical assembly, calculating a focus compensation for the second optical assembly relative to an image plane and adjusting the height of the object side wafer at the second optical assembly location to provide the focal point of the second optical assembly at or near the image plane.

In some embodiments, the height to which the object side wafer is adjusted at the location of the first optical assembly is different from the height to which the object side wafer is adjusted at the location of the second optical assembly. In some embodiments, the height to which the object side wafer is adjusted at the location of the first optical assembly is the same or substantially the same as the height to which the object side wafer is adjusted at the location of the second optical assembly.

In some embodiments, a method of producing optical imaging apparatus further comprises coupling a second electro-optical element to the second optical assembly.

These and other embodiments are described in greater detail in the detailed description which follows.

DETAILED DESCRIPTION

In one aspect, the present invention provides a wafer level optical assembly comprising a first optical element singulated from an array of optical elements, the first optical element comprising a first alignment structure and a second optical element, the second optical element comprising a second alignment structure, wherein the first alignment structure and the second alignment structure are in contact with one another. In some embodiments, the second optical element is singulated from a second array of optical elements. In some embodiments, the first array of optical elements and the second array of optical elements are different. In some embodiments, the first array of optical elements and the second array of optical elements are the same array.

In some embodiments of an optical assembly, the first optical element and/or the second optical element comprises at least one planar surface. In some embodiments, the first optical element and/or the second optical element comprises a plurality of planar surfaces. In some embodiments, one or more planar surfaces are located at the perimeter of the first optical element and/or the second optical element. In some embodiments, the perimeter of the first optical element and/or second optical element has a polygonal shape including, but not limited to, triangular, square, rectangular, pentagonal or hexagonal.

In some embodiments, for example, the first optical element and/or the second optical element is singulated from an optical wafer, the singulation process providing the first and/or second optical elements with on or more planar surfaces.

Moreover, in some embodiments, a wafer level optical assembly described herein comprises one or more planar surfaces located at the perimeter of the assembly. In some embodiments, the perimeter of a wafer level optical assembly described herein has a polygonal shape including, but not limited to, triangular, square, rectangular, pentagonal or hexagonal.

Figure 13:
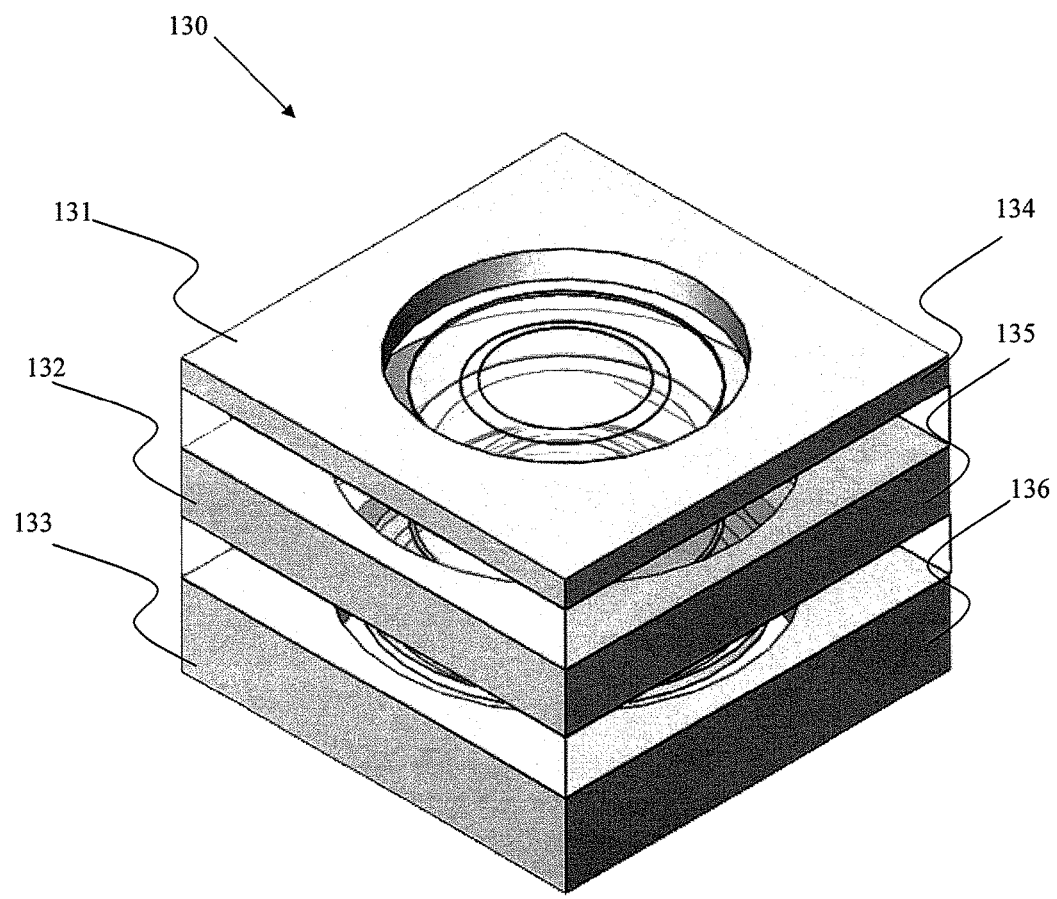
FIG. 13 illustrates a wafer level optical assembly according to one embodiment of the present invention.

FIG. 13 illustrates a wafer level optical assembly according to one embodiment of the present invention. The wafer level optical assembly (130) comprises optical elements (131, 132, 133) in a stacked configuration, wherein at least two of the optical elements (131, 132, 133) have alignment structures (not shown) in contact with one another as described herein. The optical elements (131, 132, 133) have planar surfaces (134, 135, 136) located at the perimeter of the elements, thereby providing the perimeter a square shape. As described herein, in some embodiments, the optical elements (131, 132, 133) are singulated from arrays of optical elements, the singulation providing the optical elements (131, 132, 133) one or more planar surfaces and a polygonal shape. Moreover, the perimeter of the wafer level optical assembly (130) has a square shape.

In some embodiments of wafer level optical assemblies described herein, the first alignment structure of the first optical element is positioned outside the clear aperture of the first optical element. In some embodiments, the second alignment structure of the second optical element is positioned outside the clear aperture of the second optical element.

In some embodiments, the first alignment structure is continuous around the clear aperture of the first optical element. In some embodiments, the first alignment structure is discontinuous around the clear aperture of the first optical element. In some embodiments wherein the first alignment structure is discontinuous around the clear aperture of the first optical element, the first alignment structure comprises one or a plurality of discrete alignment structures operable to contact the second alignment structure of the second optical element. In some embodiments, a discontinuous first alignment structure can comprise any number of discrete alignment structures. In some embodiments, a discontinuous first alignment structure comprises at least 1, at least 2 or at least 3 discrete alignment structures. In some embodiments, a discontinuous first alignment structure comprises at least 4 or at least 5 discrete alignment structures.

In some embodiments, the first alignment structure comprises a protrusion. In some embodiments a protrusion first alignment structure has dimensions suitable for coupling or mating with a recessed second alignment structure of a second optical element. In some embodiments, a first alignment structure comprises a continuous protrusion around the clear aperture of the first optical element. In some embodiments, a first alignment structure comprises one or more discontinuous or discrete protrusions operable for coupling or mating with one or more recessed second alignment structures of the second optical element.

In some embodiments, the first alignment structure comprises a recess. In some embodiments, a recess first alignment structure has dimensions suitable for coupling or mating with one or more protrusion second alignment structures of a second optical element. In some embodiments, a first alignment structure comprises a continuous recess around the clear aperture of the first optical element. In some embodiments, a first alignment structure comprises one or more discontinuous or discrete recesses operable for coupling or mating with one or more protrusion second alignment structures of the second optical element.

Figure 14:
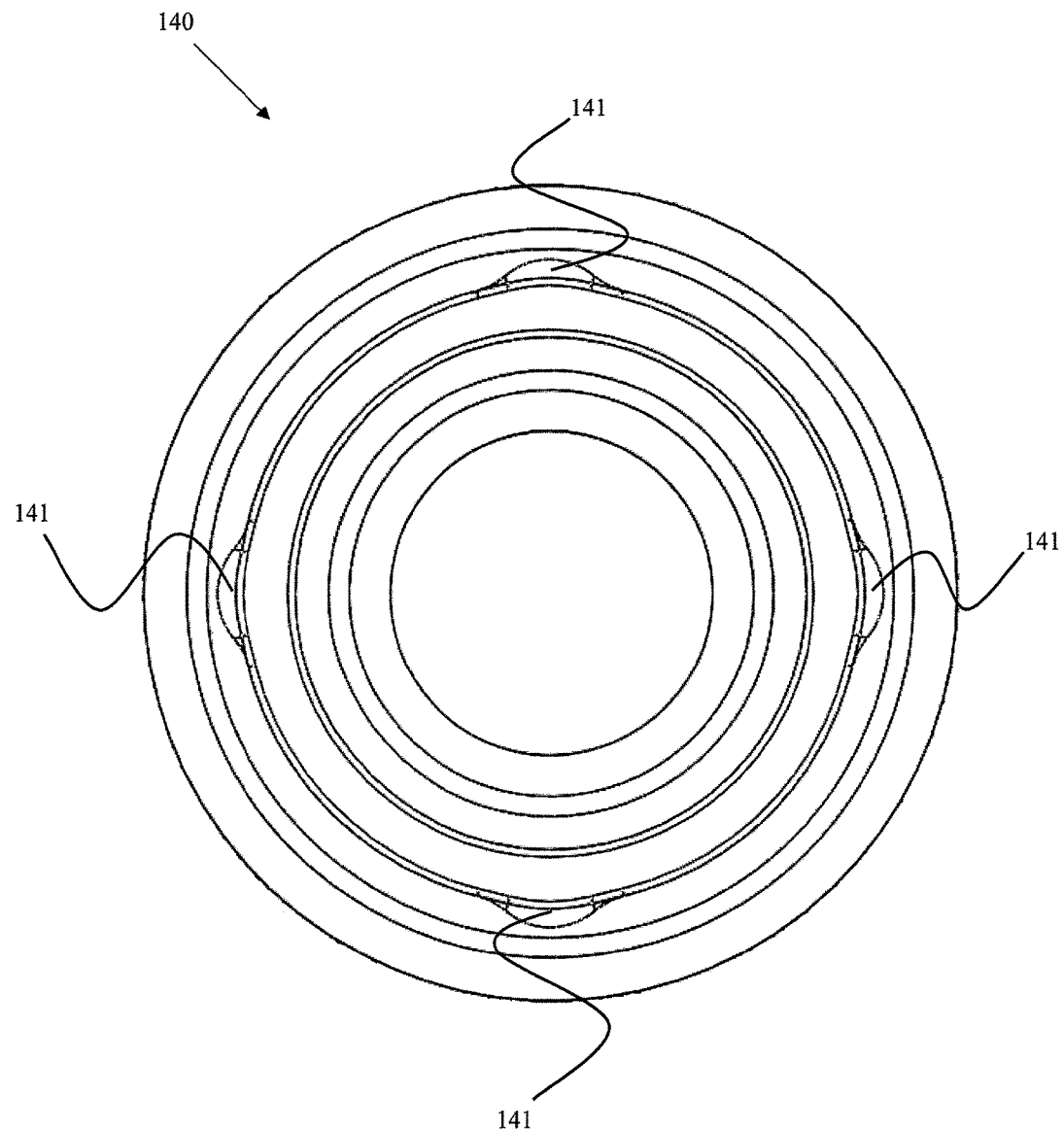
FIG. 14 illustrates a plan view of a first optical element comprising a discontinuous first alignment structure according to one embodiment of the present invention.

FIG. 14 illustrates a plan view of a first optical element comprising a discontinuous first alignment structure, the discontinuous first alignment structure comprising a plurality of discrete alignment structures according to one embodiment of the present invention. In the embodiment illustrated in FIG. 14, the discontinuous first alignment structure of the first optical element (140) comprises four discrete protrusion alignment structures (141).

Additionally, in some embodiments, the second alignment structure is continuous around the clear aperture of the second optical element. In some embodiments, the second alignment structure is discontinuous around the clear aperture of the second optical element. In some embodiments wherein the second alignment structure is discontinuous around the clear aperture of the second optical element, the second alignment structure comprises one or a plurality of discrete alignment structures operable to contact the first alignment structure of the first optical element. In some embodiments, a discontinuous second alignment structure can comprise any number of discrete alignment structures. In some embodiments, a discontinuous second alignment structure comprises at least 2 or at least 3 discrete alignment structures. In some embodiments, a discontinuous second alignment structure comprises at least 4 or at least 5 discrete alignment structures.

In some embodiments, the second alignment structure comprises a protrusion. In some embodiments a protrusion second alignment structure has dimensions suitable for coupling or mating with a recessed first alignment structure of a first optical element. In some embodiments, a second alignment structure comprises a continuous protrusion around the clear aperture of the second optical element. In some embodiments, a second alignment structure comprises one or more discontinuous or discrete protrusions operable for coupling or mating with one or more recessed first alignment structures of the first optical element.

In some embodiments, the second alignment structure comprises a recess. In some embodiments, a recess second alignment structure has dimensions suitable for coupling or mating with one or more protrusion first alignment structures of a first optical element. In some embodiments, a second alignment structure comprises a continuous recess around the clear aperture of the second optical element. In some embodiments, a second alignment structure comprises one or more discontinuous or discrete recesses operable for coupling or mating with one or more protrusion first alignment structures of the first optical element.

In some embodiments of a wafer level optical assembly, the first optical element comprises a discontinuous first alignment structure comprising a plurality of discrete alignment structures in contact with a continuous second alignment structure of the second optical element. In some embodiments of a wafer level optical assembly, the first optical element comprises a continuous first alignment structure in contact with a plurality of discrete alignment structures of a discontinuous second alignment structure of the second optical element. In some embodiments of a wafer level optical assembly, the first optical element comprises a discontinuous first alignment structure comprising a plurality of discrete alignment structures in contact with a plurality of discrete alignment structures of a discontinuous second alignment structure of the second optical element.

Discrete alignment structures of the first and/or second optical elements, in some embodiments, can reduce friction between the first and second optical elements when the first and second optical elements are brought into contact with one another. Moreover, discrete alignment structures of the first and/or second optical elements, in some embodiments, can reduce the contact surface area between the first and second optical elements, thereby diminishing the potential to over constrain the first and second optical elements when brought into contact with one another.

Figure 15:
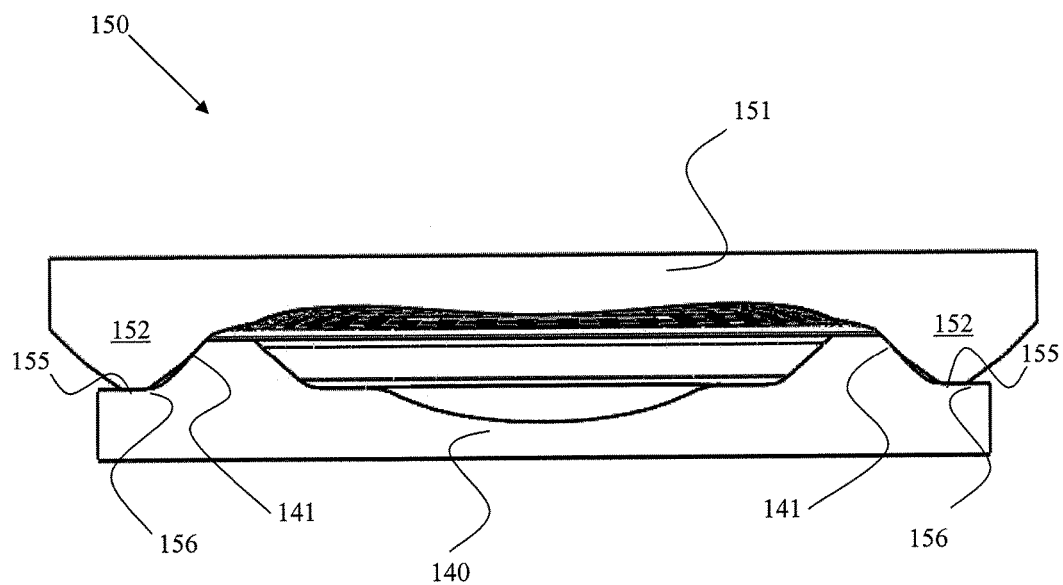
FIG. 15 illustrates a cross-sectional view of a wafer level optical assembly according to one embodiment of the present invention.

FIG. 15 illustrates a cross-sectional view of a wafer level optical assembly according to one embodiment of the present invention. The wafer level optical assembly (150) in the embodiment of FIG. 15 comprises a singulated first optical element (151) comprising a continuous first alignment structure (152) and a singulated second optical element (140) comprising a discontinuous second alignment structure comprising discrete alignment structures (141) as shown in FIG. 14. The continuous alignment structure (152) of the first optical element (151) is in contact with the discrete alignment structures (141) of the second optical element (140), thereby at least partially assisting in achieving the desired alignment of the first optical element (151) and the second optical element (140). Moreover, in the embodiment illustrated in FIG. 15, the continuous alignment structure (152) of the first optical element (151) comprises a planar or flat surface (155) at or near the apex of the alignment structure (152). In some embodiments, the planar or flat surface (155) is operable to contact a surface (156) of the second optical element (140), thereby assisting in controlling the tilt and/or axial height of the first optical element (151) when brought into contact with the second optical element (141).

Alternatively, in some embodiments, the first optical element comprises a discontinuous first alignment structure comprising discrete alignment structures, and the second optical element comprises a continuous second alignment structure. In some embodiments, the discrete alignment structures of the first optical element comprise a planar or flat surface at or near the apex of the structures operable to contact a corresponding surface of the second optical element, thereby assisting in controlling the tilt and/or axial height of the first optical element when brought into contact with the second optical element.

In some embodiments, a first optical element of an optical assembly described herein comprises a radiation transmissive substrate comprising at least one optical surface and the first alignment structure. In some embodiments, the second optical element comprises a radiation transmissive substrate comprising at least one optical surface and the second alignment structure.

A radiation transmissive substrate of the first and/or second optical element, in some embodiments, comprises any type of glass not inconsistent with the objectives of the present invention. In some embodiments, a radiation transmissive substrate comprises any polymeric or sol-gel material not inconsistent with the objectives of the present invention. In some embodiments, for example, radiation transmissive polymeric materials include polycarbonates or polyacrylates such as polyacrylic acid, polymethacrylate, polymethylmethacrylate or mixtures thereof.

As described herein, a radiation transmissive substrate comprises one or a plurality of optical surfaces. In some embodiments, an optical surface comprises a lens or other refractive optical element operable to interact with electromagnetic radiation.

In some embodiments, for example, an optical surface comprises a convex, concave, spherical or aspherical shape, including surfaces that are simultaneously concave in some regions and convex in others. In some embodiments, wherein opposing sides of a radiation transmissive substrate comprise optical surfaces, the opposing sides in combination form a biconvex, biconcave, plano-convex, plano-concave, positive meniscus or negative meniscus lens.

In some embodiments, an optical surface of the first and/or second optical element comprises one or more polymeric materials. In some embodiments, an optical surface comprises one or more epoxides, oxetanes, acrylates, methacrylates, maleate esters, thiol-enes, vinyl ethers or mixtures or copolymers thereof. In some embodiments, an optical surface comprises one or more fluoropolymers, including perfluorocyclobutyl (PFCB) based polymers.

In some embodiments wherein an optical element comprises a plurality of optical surfaces, material for each the optical surfaces is chosen independently. Alternatively, in some embodiments, materials for optical surfaces of an optical element are chosen with reference to one another.

Additionally, in some embodiments, an optical surface comprises a filter material operable to selectively pass or selectively block regions of the electromagnetic spectrum.

In some embodiments, optical surfaces are formed directly on the radiation transmissive substrate. In some embodiments, for example, optical surfaces can be replicated or lithographically produced on the radiation transmissive substrate. In some embodiments, optical surfaces are formed independent of the radiation transmissive substrate and subsequently coupled or deposited on the radiation transmissive substrate.

Figure 1:
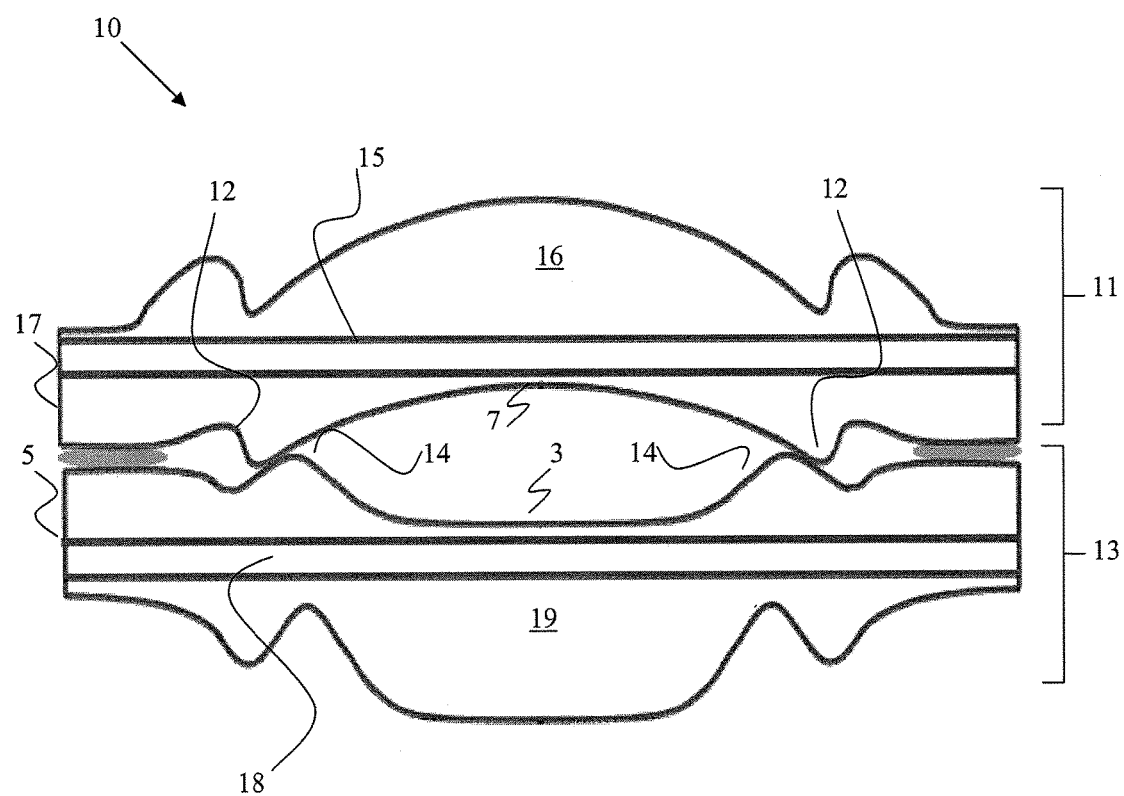
FIG. 1 illustrates cross-sectional view of a wafer level optical assembly according to one embodiment of the present invention.

FIG. 1 illustrates a cross-sectional view of a wafer level optical assembly according to one embodiment of the present invention. The optical assembly (10) in the embodiment of FIG. 1 comprises a first optical element (11) comprising a first alignment structure (12) and a second optical element (13) comprising a second alignment structure (14), wherein the first alignment structure (12) and the second alignment structure (14) are in contact with one another.

The first optical element (11) further comprises a radiation transmissive substrate (15) comprising an optical surfaces (7, 16). As illustrated in FIG. 1, the first alignment structure (12) is coupled to the radiation transmissive substrate (15) and is continuous with the optical surface (7). In some embodiments, the first alignment structure (12) is discontinuous with the optical surface (7) of a radiation transmissive substrate (15). The first wafer level optical element (11) also comprises planar surfaces (17). In some embodiments, planar surfaces (17) of the first wafer level optical element (11) are provided by singulation of the optical element (11) from a wafer or array of optical elements.

The second optical element (13) further comprises a radiation transmissive substrate (18) comprising an optical surfaces (3, 19). The second alignment structure (14) is coupled to the radiation transmissive substrate (18) and is continuous with the optical surface (3). In some embodiments, the second alignment structure (14) is discontinuous with the optical surface (3) of the radiation transmissive substrate (18). The second optical element (13) of FIG. 1 also comprises planar surfaces (5). In some embodiments, planar surfaces (5) of the second optical element (13) are provided by singulation of the optical element (13) from a wafer or array of optical elements.

In some embodiments, the first and/or second optical element of an optical assembly described herein has a monolithic structure comprising one or more optical surfaces. In having a monolithic structure, the first and/or second optical element, in some embodiments, does not comprise a supporting radiation transmissive substrate. In some embodiments, an optical surface of a monolithic optical element comprises a convex, concave, spherical or aspherical shape, including surfaces that are simultaneously concave in some regions and convex in others. In some embodiments, wherein opposing sides of a monolithic optical element comprise optical surfaces, the opposing sides in combination form a biconvex, biconcave, plano-convex, plano-concave, positive meniscus or negative meniscus lens.

In some embodiments, a monolithic optical element comprises any type of glass not inconsistent with the objectives of the present invention. In some embodiments, a monolithic optical element comprises one or more polymeric materials. In some embodiments, for example, a monolithic optical element comprises one or more epoxides, oxetanes, acrylates, methacrylates, maleate esters, thiol-enes, vinyl ethers or mixtures or copolymers thereof. In some embodiments, a monolithic optical element comprises one or more fluoropolymers, including perfluorocyclobutyl (PFCB) based polymers.

Figure 2:
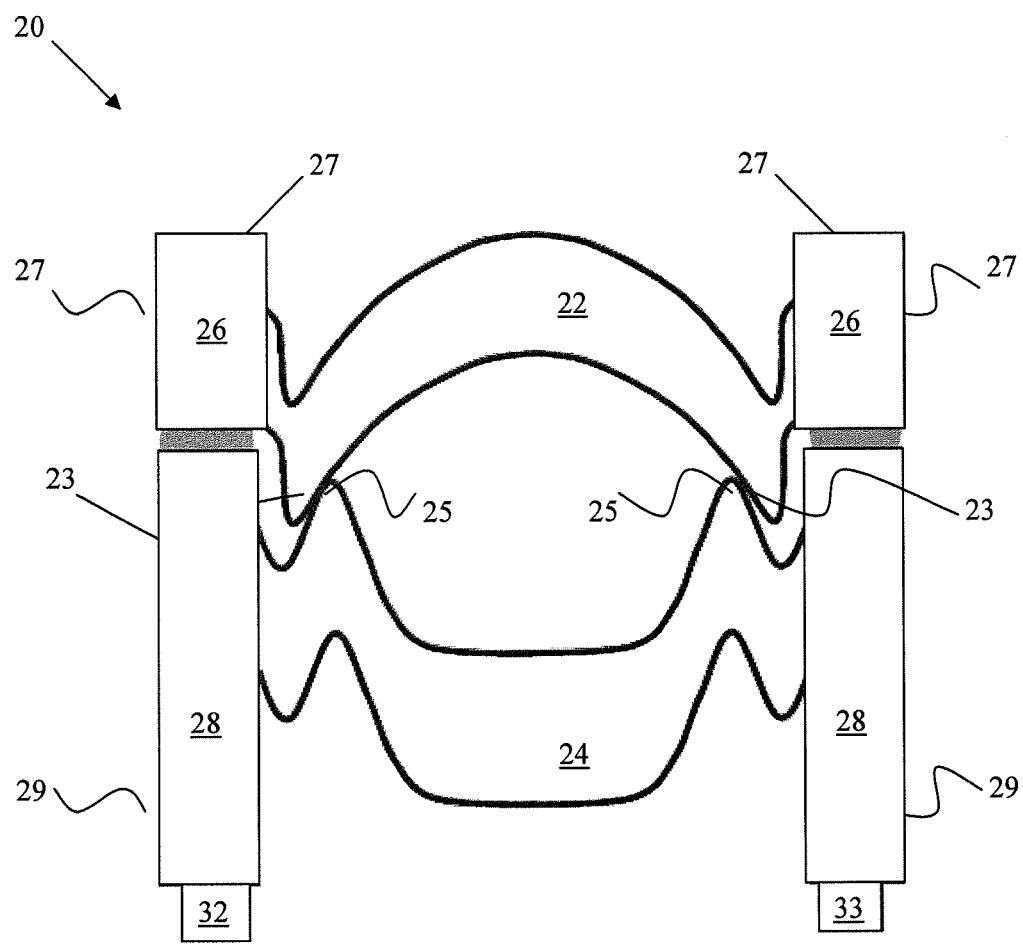
FIG. 2 illustrates a cross-sectional view of a wafer level optical assembly according to one embodiment of the present invention.

FIG. 2 illustrates a cross-sectional view of a wafer level optical assembly comprising monolithic optical elements according to one embodiment of the present invention. The wafer level optical assembly (20) of FIG. 2 comprises a first monolithic optical element (22) comprising a first alignment structure (23) and a second monolithic wafer level optical element (24) comprising a second alignment structure (25), wherein the first alignment structure (23) and the second alignment structure (25) are in contact with one another.

The first monolithic optical element (22) illustrated in FIG. 2 is at least partially disposed in an aperture or perforation of a wafer (26). The wafer (26), in some embodiments, provides the first monolithic optical element (22) with one or more planar surfaces (27). As described further herein, in some embodiments, the wafer (26) has been singulated from a larger wafer (not shown) to isolate the first monolithic optical element (22) from other optical elements disposed in apertures or perforations of the larger wafer. Singulation of the wafer (26), in some embodiments, provides the first optical element (22) one or more planar surfaces (27).

Moreover, the second monolithic optical element (24) illustrated in FIG. 2 is at least partially disposed in an aperture or perforation of a wafer (28). The wafer (28), in some embodiments, provides the second monolithic wafer level optical element (24) with one or more planar surfaces (29). In some embodiments, the wafer (28) has been singulated from a larger wafer (not shown) to isolate the second monolithic optical element (22) from other optical elements disposed in apertures or perforations of the larger wafer. Singulation of the wafer (28), in some embodiments, provides the second optical element (24) one or more planar surfaces (30).

In the embodiment of FIG. 2, the first alignment structure (23) and the second alignment structure (25) are in contact and at least partially assist in achieving the desired alignment of the first optical element (22) and the second optical element (24). The wafer (26) of the first optical element (22) is additionally coupled to the wafer (28) of the second optical element (24).

In some embodiments, an optical assembly described herein further comprises one or more focus compensation standoffs to provide the focal point of the optical assembly at or near a desired image plane. In some embodiments, one or more focus compensation standoffs can be positioned at any location of the optical assembly. In some embodiments, focus compensation standoffs are associated with the first optical element. In some embodiments, focus compensation standoffs are associated with the second optical element. In some embodiments, focus compensation standoffs are associated with the first and second optical elements.

Referring once again to FIG. 2, focus compensation standoffs (32, 33) are provided on the wafer (28) of the second monolithic optical element (24) to set the focal point of the optical assembly (20) at or near a desired image plane.

Figure 11:
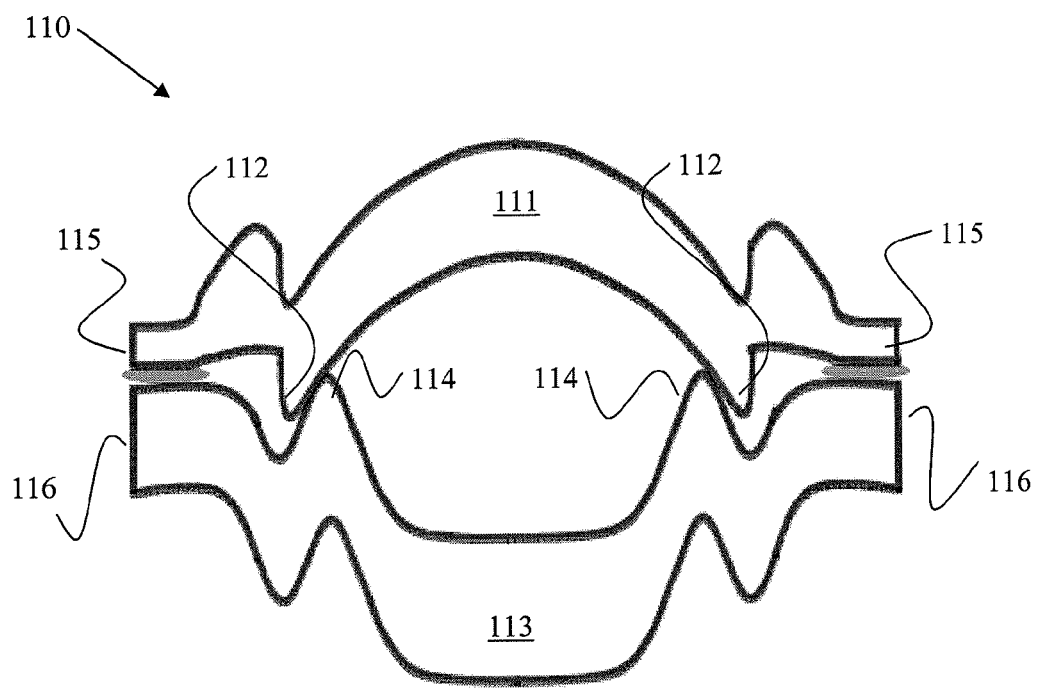
FIG. 11 illustrates a cross-sectional view of a wafer level optical assembly comprising monolithic optical elements according to one embodiment of the present invention.

FIG. 11 illustrates a cross-sectional view of a wafer level optical assembly comprising monolithic optical elements according to one embodiment of the present invention. The optical assembly (110) of FIG. 11 comprises a first monolithic wafer level optical element (111) comprising a first alignment structure (112) and a second monolithic wafer level optical element (113) comprising a second alignment structure (114), wherein the first alignment structure (112) and the second alignment structure (114) are in contact with one another. The first monolithic wafer level optical element (111) and the second monolithic wafer level optical element (113) also comprises planar surfaces (115, 116).

In some embodiments, a wafer level optical assembly described herein is positioned over an electro-optical element to provide an optical imaging apparatus. In some embodiments, an electro-optical element comprises an electromagnetic radiation sensing element. An electromagnetic radiation sensing element, in some embodiments, comprises a photosensitive region operable to detect electromagnetic radiation received by the optical imaging apparatus.

In some embodiments, the sensing element, including the photosensitive region, comprises a semiconductor. Any suitable semiconductor not inconsistent with the objectives of the present invention can be used for the sensing element, including the photosensitive region. In some embodiments, a semiconductor comprises a Group IV semiconductor, including silicon or any combination of Group IV elements. In another embodiment, a semiconductor comprises a Group III/V semiconductor or a Group II/VI semiconductor.

In some embodiments, the photosensitive region of a sensing element comprises a focal plane array. A focal plane array, in some embodiments, is a VGA sensor, comprising 640×480 pixels. In some embodiments, the sensor includes fewer pixels (e.g., CIF, QCIF), or more pixels (1 or more megapixel).

In one embodiment, a sensing element including the photosensitive region comprises a charge coupled device (CCD). In another embodiment, a sensing element including the photosensitive region comprises a complimentary metal oxide semiconductor (CMOS) architecture.

In some embodiments, an electro-optical element generates electromagnetic radiation to be provided by the optical imaging apparatus. Any desired element for generating electro-magnetic radiation not inconsistent with the objectives of the present invention can be used. In some embodiments an electro-optical element generating electromagnetic radiation comprises one or more light emitting diodes (LED). In some embodiments, a LED comprises inorganic materials such as inorganic semiconductors. In other embodiments, a LED comprises organic materials such as organic semiconductors including polymeric semiconductors. In a further embodiment, a LED comprises a mixture of organic and inorganic materials.

Figure 3:
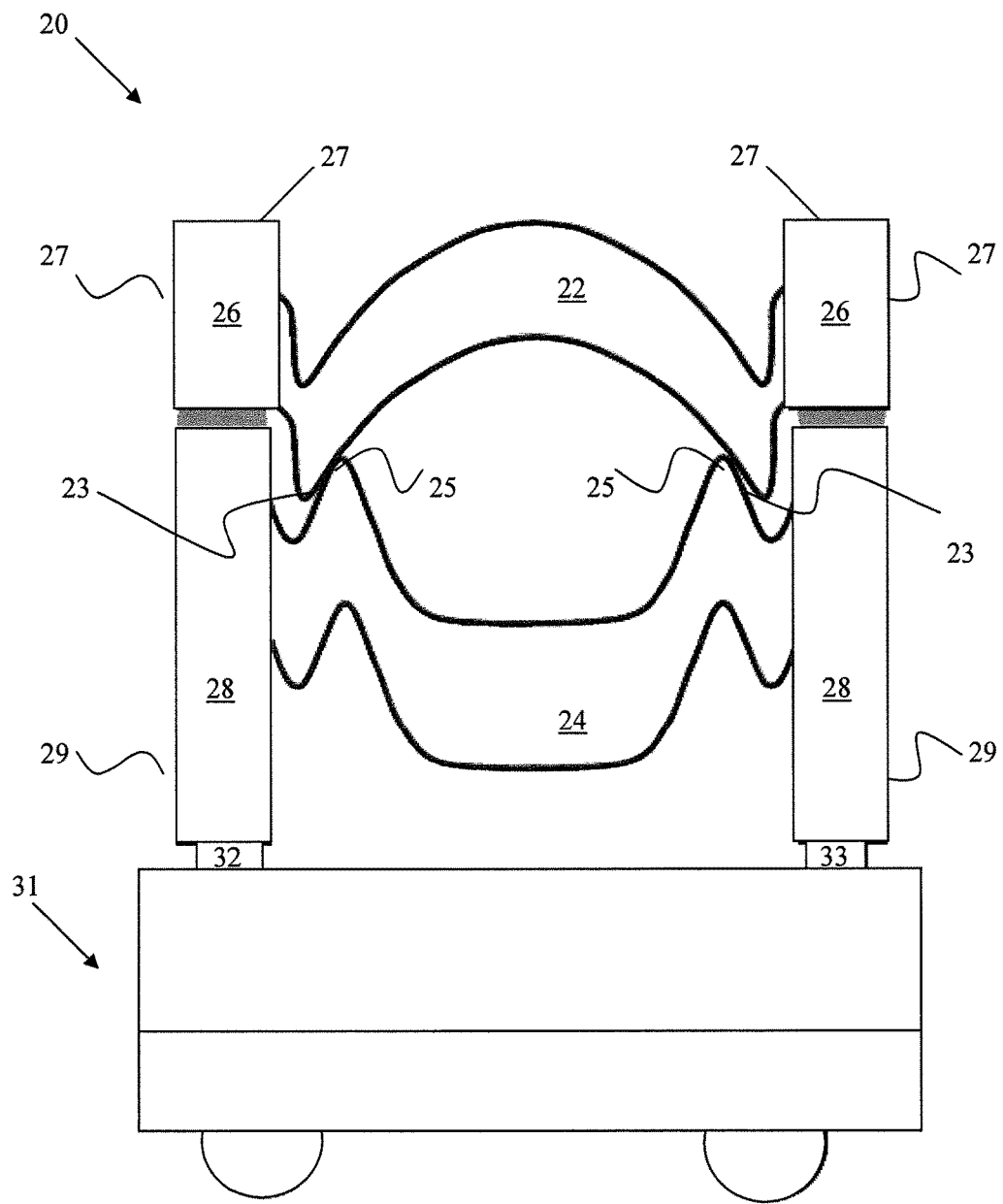
FIG. 3 illustrates a cross-sectional view of an optical imaging apparatus according to one embodiment of the present invention.

FIG. 3 illustrates the optical assembly of FIG. 2 coupled to an electro-optical element according to one embodiment of the present invention. In the embodiment illustrated in FIG. 3, the optical assembly (20) is coupled to the electro-optical element (31) through the focus compensation standoffs (32, 33) to provide an optical imaging apparatus (30). In some embodiments, the electro-optical element (31) has been singulated from other electro-optical elements (not shown) of an electro-optical element wafer.

In another aspect, the present invention provides methods of producing optical imaging apparatus. In some embodiments, a method of producing optical imaging apparatus comprises providing a singulated first object side optical element comprising an alignment structure and providing a image side wafer comprising a first image side optical element comprising an alignment structure. The singulated first object side optical element is positioned over the first image side optical element and at least partially aligned with the first image side optical element by bringing into contact the alignment structure of the first object side optical element and the alignment structure of the first image side optical element to provide a first optical assembly at a first location on the image side wafer. In some embodiments, one or more optical properties of the first object side optical element and/or first image side optical element are determined prior to positioning the singulated first object side optical element over the first image side optical element.

In some embodiments, determining one or more optical properties of an object side optical element and/or image side optical element permits identification of optical elements that do not meet specification or performance requirements prior to further processing the optical elements into optical assemblies and/or optical imaging apparatus.

In some embodiments, a method of producing optical imaging apparatus further comprises determining the focal length of the first optical assembly, calculating a focus compensation for the first optical assembly relative to an image plane and adjusting the height of the image side wafer at the first optical assembly location to provide the focal point of the first optical assembly at or near the image plane. In some embodiments, a method of producing an optical imaging apparatus further comprises coupling a first electro-optical element to the first optical assembly.

In some embodiments, a method of producing optical imaging apparatus further comprises providing a singulated second object side optical element comprising an alignment structure and providing a second image side optical element of the image side wafer, the second image side optical element comprising an alignment structure. In some embodiments, the singulated second object side optical element is positioned over the second image side optical element and at least partially aligned with the second image side optical element by bringing into contact the alignment structure of the second object side optical element and the alignment structure of the second image side optical element to provide a second optical assembly at a second location on the image side wafer. In some embodiments, one or more optical properties of the second object side optical element and/or second image side optical element are determined prior to positioning the second object side optical element over the second image side optical element.

In some embodiments, a method of producing an optical imaging apparatus further comprises determining the focal length of the second optical assembly, calculating a focus compensation for the second optical assembly relative to an image plane and adjusting the height of the image side wafer at the second optical assembly location to provide the focal point of the second optical assembly at or near the image plane.

In some embodiments, the height to which the image side wafer is adjusted at the location of the first optical assembly is different from the height to which the image side wafer is adjusted at the location of the second optical assembly. In some embodiments, the height to which the image side wafer is adjusted at the location of the first optical assembly is the same or substantially the same as the height to which the image side wafer is adjusted at the location of the second optical assembly.

In some embodiments, a method of producing optical imaging apparatus further comprises coupling a second electro-optical element to the second optical assembly.

Figure 4:
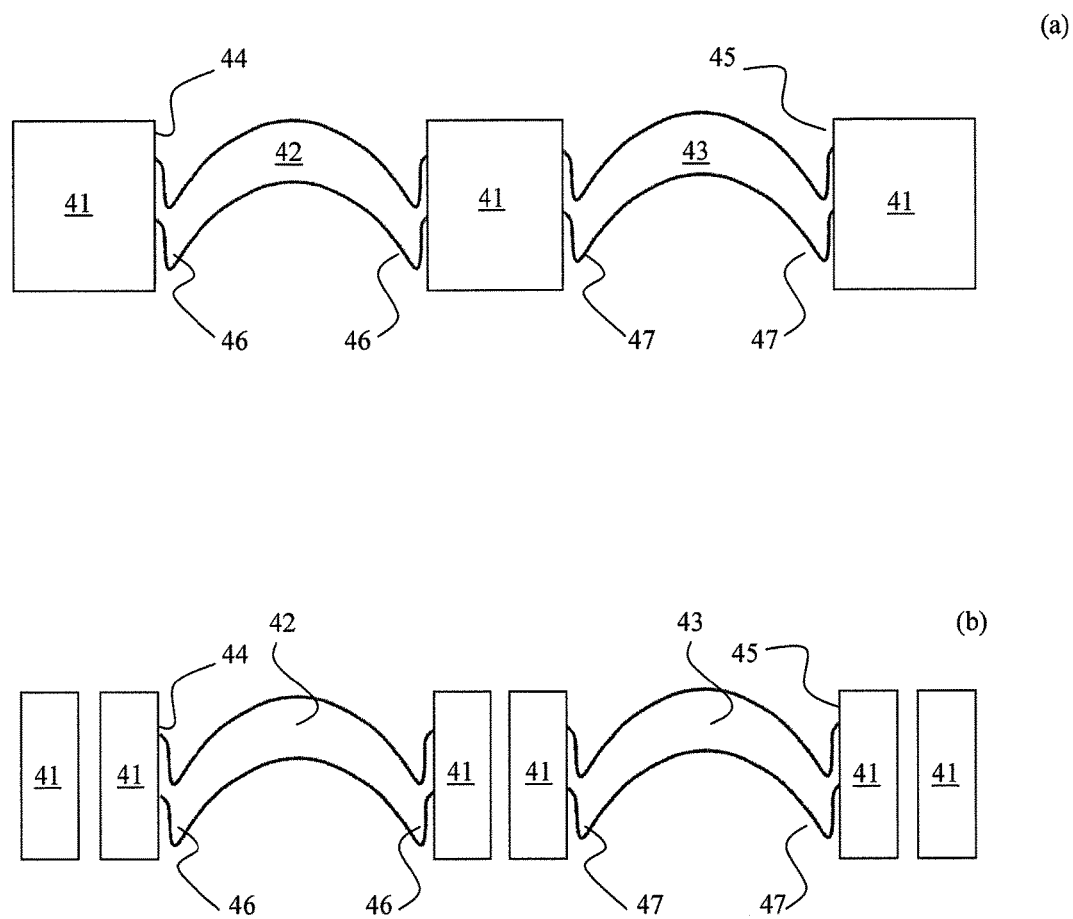
FIG. 4 illustrates a cross-sectional view of providing a singulated first object side wafer level optical element and a singulated second object side wafer level optical element according to one embodiment of the present invention.

FIG. 4 illustrates a cross-sectional view of providing a singulated first object side optical element and a singulated second object side optical element according to one embodiment of the present invention. In the embodiment of FIG. 4(a), a wafer (41) comprising the first object side optical element (42) and the second object side optical element (43) is provided. The first and second object side optical elements (42, 43) and are positioned in apertures or perforations (44, 45) of the wafer (41). The first and second object side optical elements (42, 43) display a meniscus structure and comprise alignment structures (46, 47). In the embodiment illustrated in FIG. 4, the alignment structures (46, 47) are continuous with optical surfaces of the first and second object side optical elements (42, 43).

In some embodiments, the first and second object side optical elements (42, 43) are molded in the apertures or perforations (44, 45) of the wafer (41). In some embodiments, for example, the perforated wafer (41) can be placed into a mold wherein the features of the mold responsible for providing the architecture of the first and second object side optical elements (42, 43) align with the perforations (44, 45) thereby permitting formation of the optical elements (42, 43) in the perforations (44, 45).

The wafer (41) comprising the first and second object side optical elements (42, 43) is singulated as illustrated in FIG. 4(b) to provide a singulated first object side optical element (42) and a singulated second object side optical element (43).

Figure 5:
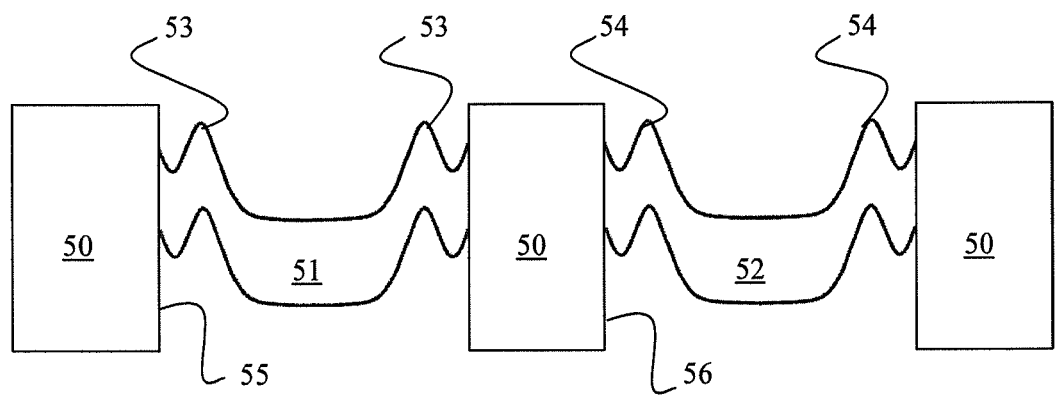
FIG. 5 illustrates a cross-sectional view of an image side wafer according to one embodiment of the present invention.

FIG. 5 illustrates a cross-sectional view of an image side wafer according to one embodiment of the present invention. The image side wafer (50) comprises a first image side optical element (51) and a second image side optical element (52). The first and second image side optical elements (51, 52) comprise alignment structures (53, 54). In the embodiment of FIG. 5, the first and second image side optical elements (53, 54) are positioned in apertures or perforations (55, 56) of the image side wafer (50). In some embodiments, the first and second image side optical elements (51, 52) are molded in the apertures or perforations (55, 56) of the image side wafer (50). In some embodiments, the first and second image side optical elements (51, 52) are molded in the apertures or perforations (55, 56) of the image side wafer (50) according to methods described herein.

Figure 6:
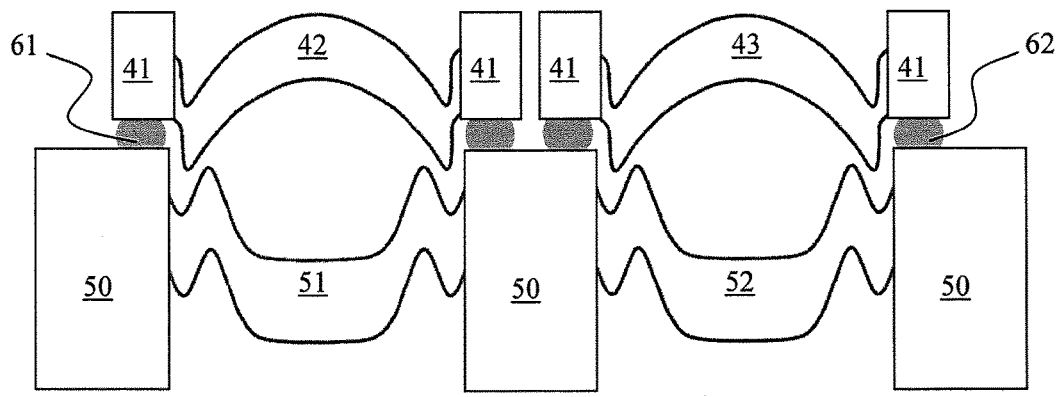
FIG. 6 illustrates a cross-sectional view of positioning singulated object side wafer level optical elements over image side wafer level optical elements according to one embodiment of the present invention.

FIG. 6 illustrates a cross-sectional view of positioning singulated object side optical elements over image side wafer level optical elements according to one embodiment of the present invention. As illustrated in FIG. 6, the singulated first object side optical element (42) is positioned over the first image side optical element (51). A bonding agent (61), in some embodiments, is disposed between the singulated wafer (41) of the object side optical element (42) and the image side wafer (50) at the location of the first image side optical element (51).

In the embodiment of FIG. 6, the singulated second object side optical element (43) is positioned over the second image side optical element (52). A bonding agent (62), in some embodiments, is disposed between the singulated wafer (41) of the second object side optical element (43) and the image side wafer (50) at the location of the second image side optical element (52).

Figure 7:
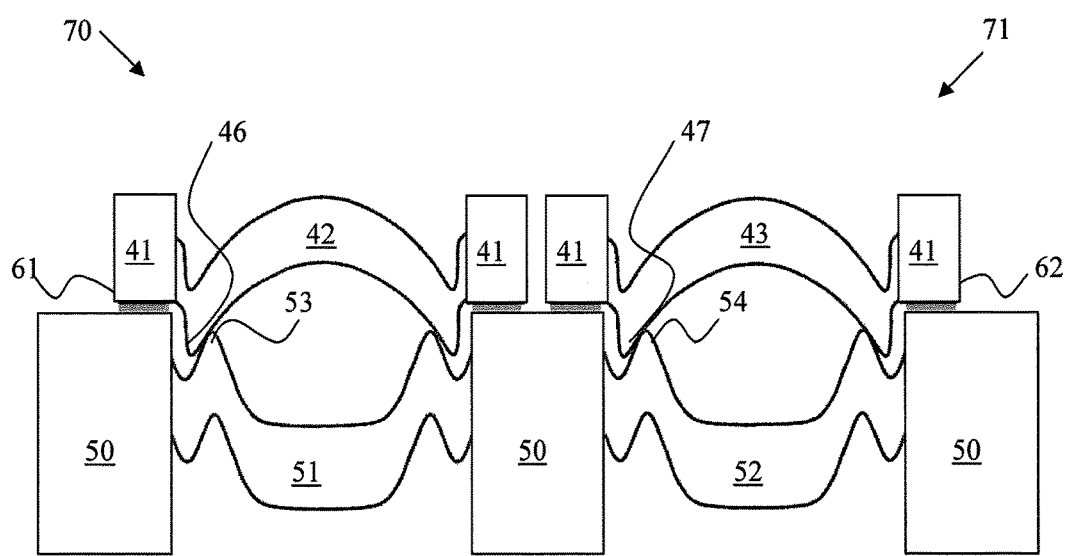
FIG. 7 illustrates a cross-sectional view of aligning singulated object side wafer level optical elements with image side wafer level optical elements through alignment structures according to one embodiment of the present invention.

FIG. 7 illustrates a cross-sectional view of aligning singulated object side optical elements with wafer level image side optical elements through alignment structures according to one embodiment of the present invention. As illustrated in FIG. 7, the alignment structure (46) of the singulated first object side optical element (42) is in contact with the alignment structure (53) of the first image side optical element (51), thereby assisting in providing the desired alignment between the singulated first object side optical element (42) and the first image side optical element (51) to provide a first optical assembly (70). Moreover, the alignment structure (47) of the singulated second object side optical element (43) is in contact with the alignment structure (54) of the second image side optical element (52), thereby assisting in providing the desired alignment between the singulated second object side optical element (43) and the second image side optical element (52) to provide a second optical assembly (71).

In some embodiments, once the desired alignment is achieved between the singulated first object side optical element (42) and the first image side optical element (51), the bonding agent (61) between the singulated wafer (41) of the object side optical element (42) and the image side wafer (50) is cured or hardened to lock the alignment in place. In some embodiments, once the desired alignment is achieved between the singulated second object side optical element (43) and the second image side optical element (52), the bonding agent (62) between the singulated wafer (41) of the object side optical element (43) and the image side wafer (50) is cured or hardened to lock the alignment in place. In some embodiments, curing or hardening of the bonding agent (61) at the first optical assembly (70) is administered simultaneously or substantially simultaneously with the curing or hardening of the bonding agent (62) of the second optical assembly (71). In some embodiments, curing or hardening of the bonding agent (61) at the first optical assembly (70) is administered serially in relation to the curing or hardening of the bonding agent (62) of the second optical assembly (71).

Figure 8:
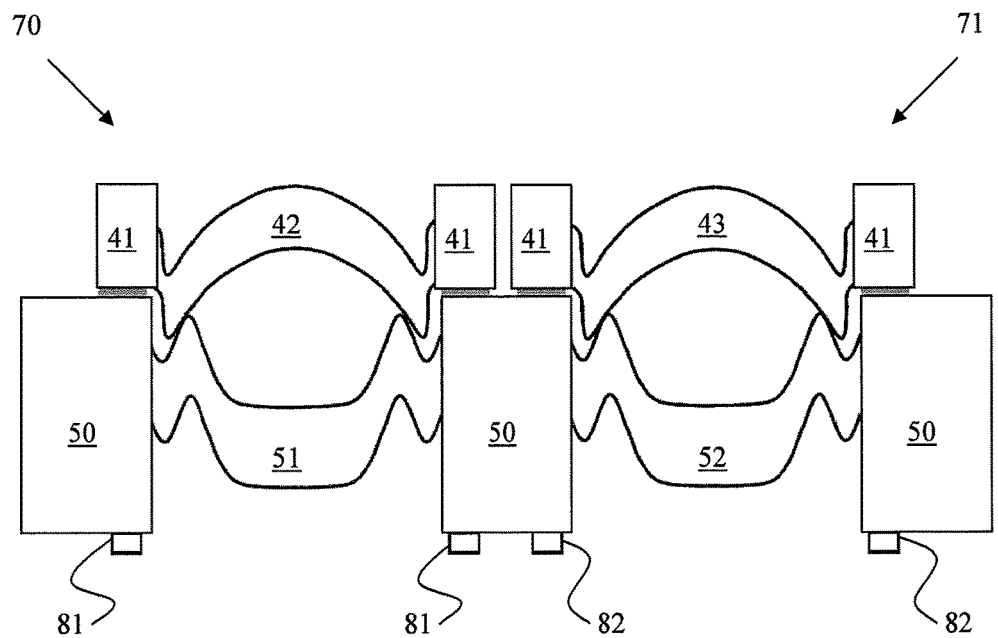
FIG. 8 illustrates a cross-sectional view of adjusting the height of an image side wafer in view of a calculated focus compensation standoff for a first optical assembly and a second optical assembly according to one embodiment of the present invention.

FIG. 8 illustrates a cross-sectional view of adjusting the height of the image side wafer in view of a calculated focus compensation for a first optical assembly and a second optical assembly according to one embodiment of the present invention. In the embodiment of FIG. 8, the height of the image side wafer (50) at the first optical assembly (70) location is adjusted to provide focus compensation standoffs (81) operable to provide the focal point of the of the first optical assembly (70) at or near the desired image plane. Additionally, the height of the image side wafer (50) at the second optical assembly (71) location is adjusted to provide focus compensation standoffs (82) operable to provide the focal point of the of the second optical assembly (71) at or near the desired image plane.

In some embodiments, focus compensation standoffs (81) have a different height than focus compensation standoffs (82). In some embodiments, focus compensation standoffs (81) have the same or substantially the same height as focus compensation standoffs (82).

Figure 9:
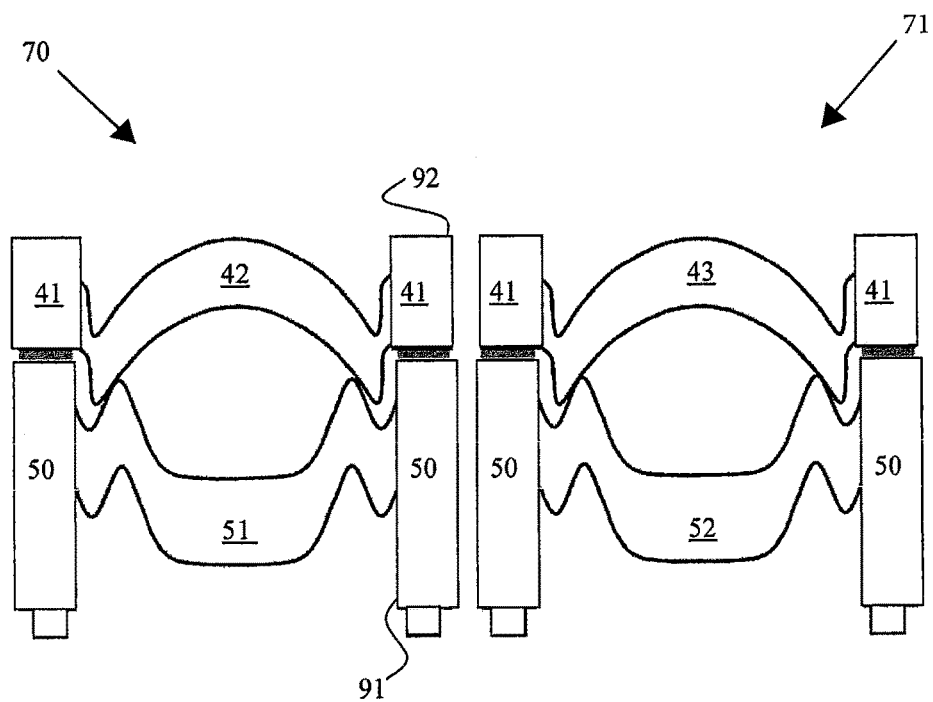
FIG. 9 illustrates a cross-sectional view of singulation of an image side wafer to provide discrete optical assemblies according to one embodiment of the present invention.

A method of producing optical imaging apparatus, in some embodiments, further comprises singulating the first optical assembly from the second optical assembly. In some embodiments, the image side optical wafer is singulated to provide discrete first and second optical assemblies. FIG. 9 illustrates a cross-sectional view of singulation of an image side wafer to provide discrete optical assemblies according to one embodiment of the present invention. As illustrated in FIG. 9, the image side wafer (50) is singulated to provide a first optical assembly (70) independent of the second optical assembly (71). As singulation of the image side wafer (50) is conducted independently of singulation of the wafer (41) of the object side optical elements (42, 43), the image side wafer, in some embodiments, can have a width (91) less than or greater than the width (92) of the wafer (41). In some embodiments, the width (91) of the image side wafer (50) is substantially the same as the width (92) of the wafer (41) of the object side optical elements (42, 43).

Figure 12:
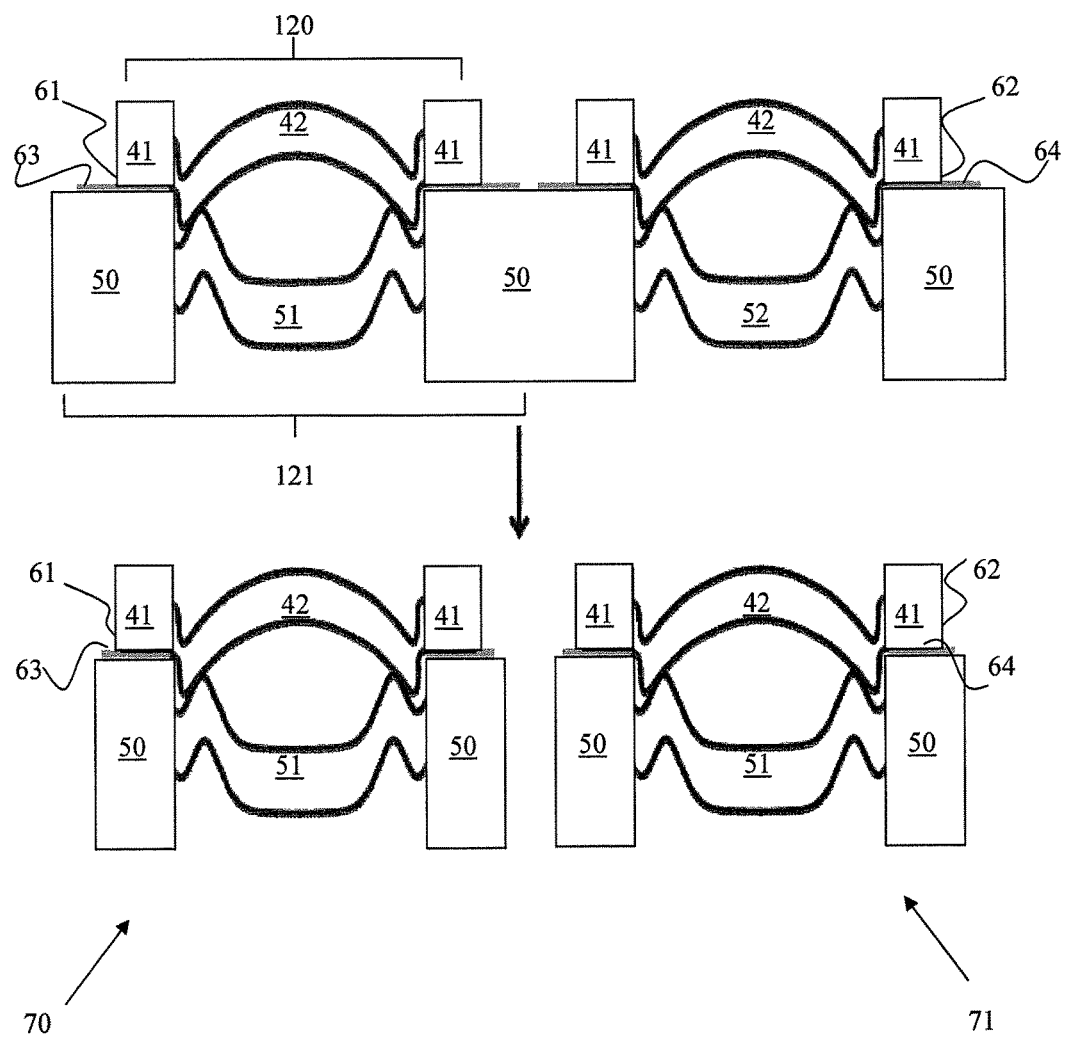
FIG. 12 illustrates a cross-sectional view of an optical assembly wherein an object side optical element has a different pitch than the image side optical element according to one embodiment of the present invention.

Moreover, in some embodiments, a singulated object side optical element has a different pitch than the image side optical element. FIG. 12 illustrates an optical assembly wherein an object side optical element has a different pitch than the image side optical element according to one embodiment of the present invention. As illustrated in FIG. 12, the object side optical elements (42, 43) have a pitch (120) different than the pitch (121) of the image side optical elements (51, 52) of the image side wafer (50). The image side wafer (50), in some embodiments, is singulated subsequent to locking the alignment of the object side optical elements (42, 43) into place with bonding material (61, 62). As described herein, singulation of the image side wafer (50), in some embodiments, provides discrete or independent optical assemblies (71, 72). In the embodiment of FIG. 12, the width of the image side wafer (50) of the optical assemblies (71, 72) is greater than the width of the wafer (41) of the object side optical elements (42, 43). In some embodiments, bonding material (61, 62) spills out onto the width (63, 64) of the image side wafer that is not covered by the wafer (41) of the object side optical elements (42, 43).

Figure 10:
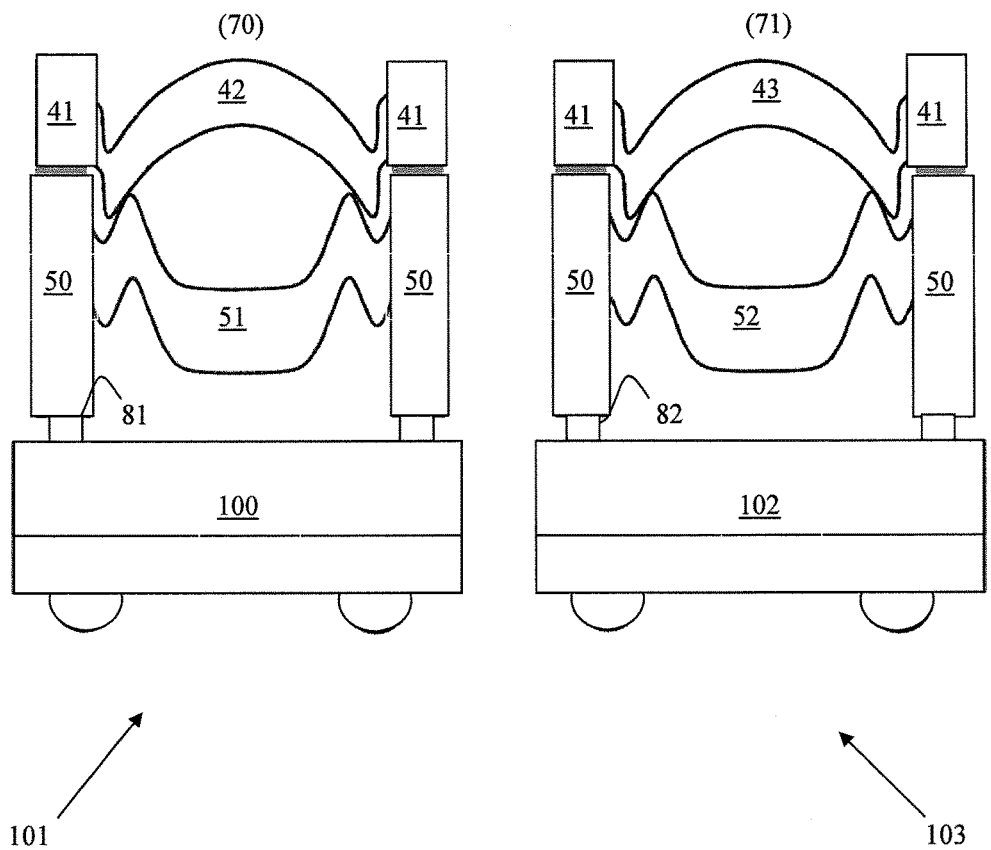
FIG. 10 illustrates a cross-sectional view of coupling a singulated first optical assembly to a first electro-optical element and coupling a singulated second optical assembly to a second electro-optical element according to one embodiment of the present invention.

FIG. 10 illustrates a cross-sectional view of coupling a singulated first optical assembly to a first electro-optical element and coupling a singulated second optical assembly to a second electro-optical element according to one embodiment of the present invention. As illustrated in FIG. 10, a singulated first optical assembly (70) is coupled to a singulated first electro-optical element (100) to provide a first optical imaging apparatus (101), and a singulated second optical assembly (71) is coupled to a singulated second electro-optical element (102) to provide a second optical imaging apparatus (103). In the embodiment of FIG. 10, the singulated first (70) and second (71) optical assemblies are coupled to the singulated first (100) and second (102) electro-optical elements by focus compensation standoffs (81, 82).

In some embodiments, an optical assembly described herein is coupled to an electro-optical element by structure other than a focus compensation standoff. In some embodiments wherein the optical assembly is not coupled to an electro-optical element by focus compensation standoffs, the optical assembly may not comprise focus compensation standoffs or placement of the focus compensation standoffs in the optical assembly precludes engagement with the electro-optical element.

Additionally, in some embodiments, singulated optical assemblies are populated onto a wafer comprising a plurality of electro-optical elements, thereby providing a plurality of joined optical imaging apparatus. The electro-optical elements can be singulated to provide a plurality of discrete optical imaging apparatus.

Alternatively, in some embodiments, a method of producing optical imaging apparatus comprises providing a singulated first image side optical element comprising an alignment structure and providing a object side wafer comprising a object image side optical element comprising an alignment structure. The singulated first image side optical element is positioned over the first object side optical element and at least partially aligned with the first object side optical element by bringing into contact the alignment structure of the first image side optical element and the alignment structure of the first object side optical element to provide a first optical assembly at a first location on the object side wafer. In some embodiments, one or more optical properties of the first image side optical element and/or first object side optical element are determined prior to positioning the singulated first image side optical element over the first object side optical element.

In some embodiments, a method of producing optical imaging apparatus further comprises determining the focal length of the first optical assembly, calculating a focus compensation for the first optical assembly relative to an image plane and adjusting the height of the object side wafer at the first optical assembly location to provide the focal point of the first optical assembly at or near the image plane. In some embodiments, a method of producing an optical imaging apparatus further comprises coupling a first electro-optical element to the first optical assembly.

In some embodiments, a method of producing optical imaging apparatus further comprises providing a singulated second image side optical element comprising an alignment structure and providing a second object side optical element of the object side wafer, the second object side optical element comprising an alignment structure. In some embodiments, the singulated second image side optical element is positioned over the second object side optical element and at least partially aligned with the second object side optical element by bringing into contact the alignment structure of the second image side optical element and the alignment structure of the second object side optical element to provide a second optical assembly at a second location on the object side wafer. In some embodiments, one or more optical properties of the second image side optical element and/or second object side optical element are determined prior to positioning the second image side optical element over the second object side optical element.

In some embodiments, a method of producing an optical imaging apparatus further comprises determining the focal length of the second optical assembly, calculating a focus compensation for the second optical assembly relative to an image plane and adjusting the height of the object side wafer at the second optical assembly location to provide the focal point of the second optical assembly at or near the image plane.

In some embodiments, the height to which the object side wafer is adjusted at the location of the first optical assembly is different from the height to which the object side wafer is adjusted at the location of the second optical assembly. In some embodiments, the height to which the object side wafer is adjusted at the location of the first optical assembly is the same or substantially the same as the height to which the object side wafer is adjusted at the location of the second optical assembly.

In some embodiments, a method of producing optical imaging apparatus further comprises coupling a second electro-optical element to the second optical assembly.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A wafer level optical assembly comprising:
   a first wafer;
   a second wafer coupled to the first wafer;
   a first optical element disposed in a perforation of the first wafer and coupled to the first wafer, the first optical element comprising a first optical surface with a first alignment structure, wherein the first alignment structure is along at least a portion of a perimeter of the first optical surface and adjacent to the first wafer, and wherein the first alignment structure comprises a first protrusion; and
   a second optical element disposed in a perforation of the second wafer and coupled to the second wafer, the second optical element comprising a second optical surface with a second alignment structure, wherein the second alignment structure is along at least a portion of a perimeter of the second optical surface and adjacent to the second wafer, and wherein the second alignment structure comprises a second protrusion and a recess,
   wherein the first protrusion is coupled with the recess such that the first alignment structure and the second alignment structure are in contact,
   wherein the first protrusion and the second protrusion are in contact, and
   wherein the first protrusion is disposed in the recess between the second protrusion and the second wafer.

2. The wafer level optical assembly of claim 1, wherein a perimeter of the first optical element comprises at least one planar surface.

3. The wafer level assembly of claim 2, wherein a perimeter of the second optical element comprises at least one planar surface, and wherein the perimeter of the second optical element has a polygonal shape.

4. The wafer level optical assembly of claim 1, wherein the perimeter of the first optical element has a polygonal shape, and wherein the first alignment structure is discontinuous around a clear aperture of the first optical element.

5. The wafer level optical assembly of claim 1, wherein the first alignment structure is outside a clear aperture of the first optical element.

6. The wafer level optical assembly of claim 5, wherein the first alignment structure is continuous around the clear aperture of the first optical element.

7. The wafer level optical assembly of claim 6, wherein the second alignment structure is continuous around the clear aperture of the second optical element.

8. The wafer level optical assembly of claim 6, wherein the second alignment structure is discontinuous around the clear aperture of the second optical element.

9. The wafer level optical assembly of claim 1, wherein the first alignment structure comprises a plurality of discrete alignment structures.

10. The wafer level optical assembly of claim 1, wherein the first protrusion is disposed along a portion of a concave portion of the first optical surface.

11. The wafer level optical assembly of claim 10, wherein the second alignment structure comprises a second recess disposed along a portion of a convex portion of the second optical surface, and wherein the concave portion of the first optical surface faces the convex portion of the second optical surface.

12. The wafer level optical assembly of claim 1, further comprising:
   a third wafer coupled to the second wafer; and
   a third optical element disposed in a perforation of the third wafer and coupled to the third wafer, wherein the third optical element comprises a third optical surface with a third alignment structure, and wherein the third alignment structure is in contact with the second alignment structure.

13. The wafer level optical assembly of claim 1, wherein the first alignment structure is adjacent to at least two opposite surfaces of the first wafer, and wherein the second alignment structure is adjacent to at least two opposite surfaces of the second wafer.

14. A method of producing an optical imaging apparatus comprising:
   providing a first object side optical element in a perforation of an object side wafer, the first object side optical element comprising a first alignment structure, the first alignment structure comprising a first protrusion formed from a first optical surface of the first object side optical element, wherein the first alignment structure is along at least a portion of a perimeter of the first optical surface and adjacent to the object side wafer;
   providing an image side wafer comprising a first image side optical element, the first image side optical element comprising a second alignment structure, the second alignment structure comprising a second protrusion and a recess formed from a second optical surface of the first image side optical element, wherein the second alignment structure is along at least a portion of a perimeter of the second optical surface and adjacent to the image side wafer;
   after providing the singulated first object side optical element, positioning the first object side optical element over the image side wafer comprising the first image side optical element;
   at least partially aligning the first protrusion with the image side wafer comprising the first image side optical element by bringing into contact the first protrusion, the recess, and the second protrusion to provide a first optical assembly at a first location on the image side wafer, wherein the first protrusion is disposed in the recess between the second protrusion and the image side wafer; and
   coupling at least a portion of the object side wafer to at least a portion of the image side wafer.

15. The method of claim 14, wherein the first object side optical element comprises a perimeter having a polygonal shape, and wherein one or more optical properties of the first object side optical element are determined prior to positioning the first object side optical element over the first image side optical element.

16. The method of claim 14, further comprising determining a focal length of the first optical assembly, calculating a focus compensation for the first optical assembly relative to an image plane and adjusting a height of the image side wafer at the first location to provide a focal point of the first optical assembly at or near the image plane, and singulating the first object side optical element prior to the coupling.

17. The method of claim 16 further comprising coupling a first electro-optical element to the first optical assembly.

18. The method of claim 14 further comprising singulating the first object side optical element prior to the coupling, providing a singulated second object side optical element comprising an alignment structure, providing a second image side optical element comprising an alignment structure and positioning the singulated second object side optical element over the second image side optical element on the image side wafer.

19. The method of claim 18 further comprising at least partially aligning the singulated second object side optical element with the second image side optical element by bringing into contact the alignment structure of the singulated second object side optical element with the alignment structure of the second image side optical element to provide a second optical assembly at a second location on the image side wafer.

20. The method of claim 19, wherein one or more optical properties of the singulated second object side optical element are determined prior to positioning the singulated second object side optical element over the second image side optical element.

21. The method of claim 19, further comprising:
determining a focal length of the second optical assembly;
calculating a focus compensation for the second optical assembly relative to an image plane;
adjusting a height of the image side wafer at the second location to provide a focal point of the second optical assembly at or near the image plane; and
coupling a second electro-optical element to the second optical assembly.

22. A wafer level optical assembly comprising:
a first optical element comprising a first optical surface with a first alignment structure, wherein the first alignment structure is along at least a portion of a perimeter of the first optical surface, and wherein the first alignment structure comprises a first protrusion; and
a second optical element comprising a second optical surface with a second alignment structure, wherein the second alignment structure is along at least a portion of a perimeter of the second optical surface, and wherein the second alignment structure comprises a second protrusion and a recess,
wherein the first protrusion is coupled with the recess such that the first alignment structure and the second alignment structure are in contact,
wherein the first protrusion and the second protrusion are in contact, and
wherein the first protrusion is disposed in the recess between the second protrusion and a raised edge of the perimeter of the second optical surface.

23. The wafer level optical assembly of claim 22, further comprising:
a first wafer; and
a second wafer coupled to the first wafer,
wherein:
the first optical element is disposed in a perforation of the first wafer and coupled to the first wafer,
the first alignment structure is adjacent to the first wafer,
the second optical element is disposed in a perforation of the second wafer and coupled to the second wafer,
the second alignment structure is adjacent to the second wafer,
the first protrusion is disposed in the recess between the second protrusion and the second wafer, and
the first alignment structure further comprises a second recess disposed between the first wafer and the first protrusion.

* * * * *